June 17, 1969   O. J. COTHRAN   3,450,622
ELECTROLYTIC APPARATUS FOR REMOVING METALS FROM SOLUTIONS
Filed May 17, 1966   Sheet 1 of 2

INVENTOR
OTIS J. COTHRAN
Bailey + Dority
ATTORNEYS

INVENTOR
OTIS J. COTHRAN

Bailey + Doulty
ATTORNEYS

United States Patent Office 3,450,622
Patented June 17, 1969

3,450,622
ELECTROLYTIC APPARATUS FOR REMOVING METALS FROM SOLUTIONS
Otis J. Cothran, 36 Gurley Ave., Greenville, S.C. 29605
Filed May 17, 1966, Ser. No. 550,863
Int. Cl. C22d 1/12; B01k 3/02
U.S. Cl. 204—234      1 Claim

ABSTRACT OF THE DISCLOSURE

A device for the electrolytic recovery of metals from solutions. A recirculation system adds untreated solution to newly treated solution in a recirculated retreatment cycle.

---

Figure 1:
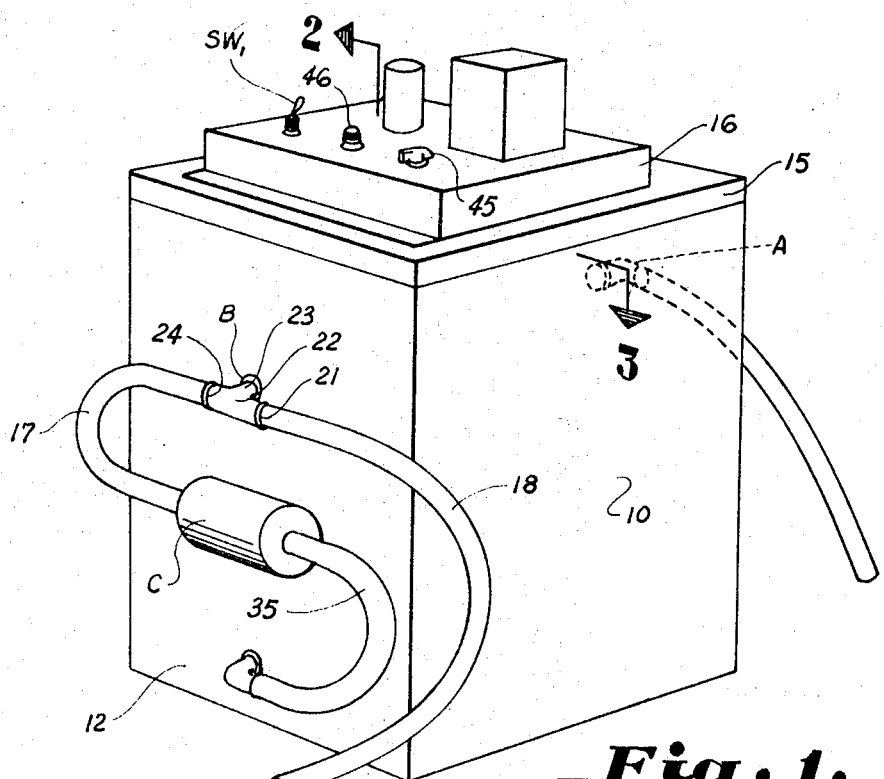

This invention relates to electrolytic apparatus for recovering metals from solutions, and more particularly for recovering silver from spent photographic fixing solutions.

It is well known that in the processing of photographic films in such places as photographic laboratories and hospitals the silver from the film is deposited in the photographic fixing solution. After the photographic fixing solution reaches a certain concentration of silver poor quality film is developed and the fixing solution must be replaced with new solution. Where the film is being processed manually, if the used solution is rejuvenated by removing the silver therefrom, the solution may again, in some cases, be used for developing film. Normally, however, where automatic film processing machines are utilized, it is desirable to dispose of the fluid and replenish the machine with new fluid. Prior to disposing of the fluid it is desirable that the silver be removed therefrom, since it has a commercial value.

Heretofore, electrolytic apparatus have been utilized for recovering the silver from the photographic fixing solution. The electrolytic devices being used for processing the fluid for automatic film processing machines at the present time leave substantial amounts of silver in the spent solution.

There are several reasons why the electrolytic recovery devices being used at the present fail to recover substantial amounts of silver from the spent solution. One reason is the relatively small surface area of the cathode plates upon which the silver collects. The greater the surface area of the cathode, the more silver can be collected thereon. Another reason is that the spent solution is not in contact with the cathode for a sufficient period of time to remove the silver therefrom before being passed out of the electrolytic device. This is particularly true where large quantities of spent photographic fixing solution are intermittently supplied to the electrolytic devices. Another problem which frequently accompanies electrolytic devices is that the voltage on the electrodes is permitted to rise as silver is removed from the solution. If the voltage rises above a predetermined point, impurities such as carbon and sulfides collect on the cathode thus, decreasing the purity of the silver being collected. It is desirable that the voltage be maintained constant during the electrolytic process although, the current is permitted to vary in proportion to the conductivity of the electrolytic solution.

Heretofore, in order to avoid the above mentioned problems the spent photographic fixing solution is placed in bottles and picked up from the hospitals and film processing laboratories approximately once a week and taken to a processing station so that the silver can be removed from the solution with extreme care. Such a method of handling the solution is both time consuming and inconvenient in that many bottles have to be placed on location for receiving the spent solution, and the film processing establishments have to be visited frequently for collection of the bottles.

Accordingly, it is an important object of this invention to provide an improved electrolytic device for recovering meals from solutions.

Another important object of this invention is to provide an electrolytic device which can handle an irregular or intermittent flow of solution having metal therein.

Still another important object of the present invention is to provide an electrolytic device which can be readily connected to the output of an automatic film processing machine for removing silver from spent photographic fixing solution flowing from the machine, and in which the fixing solution can be recirculated through the electrolytic device.

A further important object of the present invention is to provide an electrolytic device which includes a cathode having a large surface area which may be readily removed from the electrolytic device after silver has been collected thereon for processing to remove the silver therefrom.

Another important object of the present invention is to provide an electrolytic device wherein the voltage on the electrodes is maintained constant although current flow through the solution carried in the electrolytic device is permitted to vary.

Still another important object of the present invention is to provide an electrolytic device which removes metals from solutions with a minimum of impurities therein.

A further object of the present invention is to provide an electrolytic device wherein spent photographic fixing solution is recirculated through a package of steel wool which constitutes the cathode of the electrolytic device so as to maximize the time the solution is in contact with the steel wool.

Still another object of the present invention is to provide an electrolytic device which may be placed behind existing electrolytic cells for removing silver from the exhausted solution from existing cells.

Another important object of the present invention is to provide an electrolytic device which is simple, inexpensive, convenient, and requires very little maintenance.

The construction designed to carry out the invention will be hereinafter described, together with other features thereof.

Figure 2:
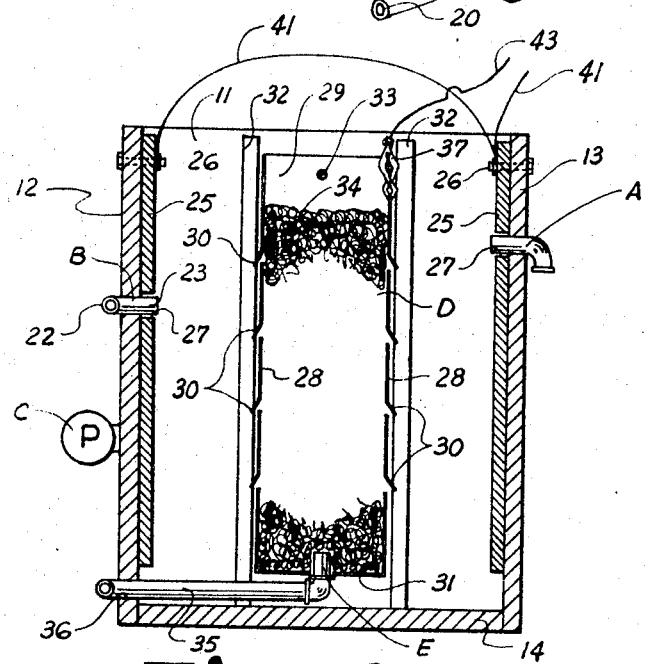
Figure 3:
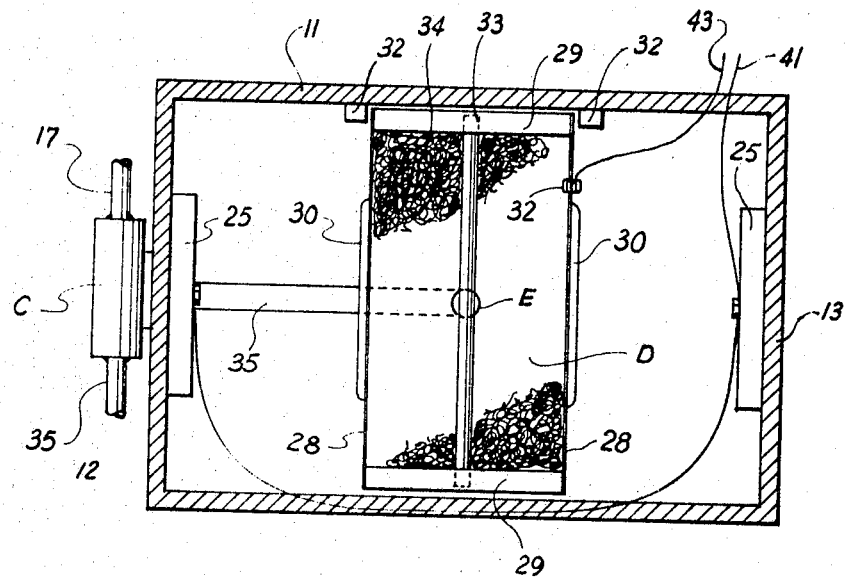
Figure 4:
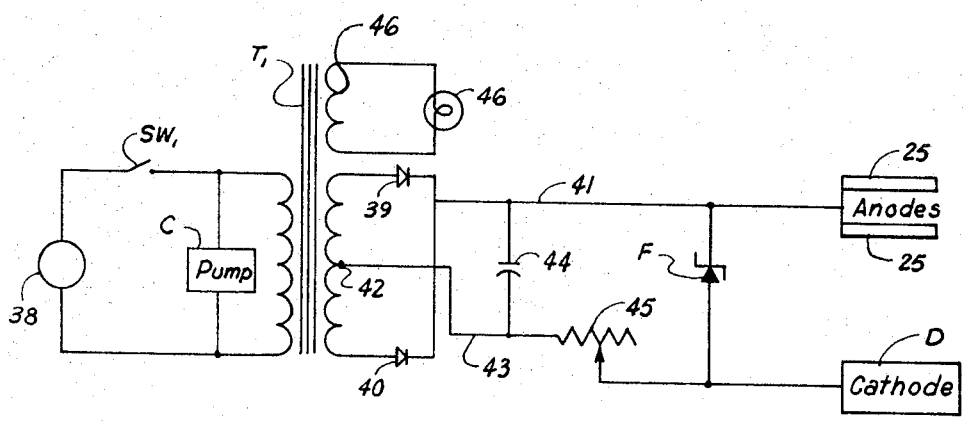

The invention will be more readily understood from a reading of the following specification and by reference to the accompanying drawings forming a part thereof, wherein an example of the invention is shown and wherein:

FIGURE 1 is a perspective view illustrating an electrolytic device constructed in accordance with the present invention, FIGURE 2 is a longitudinal sectional elevation taken on line 2—2 in FIGURE 1, FIGURE 3 is a plan view of the electrolytic cell taken along line 3—3 of FIGURE 1, and FIGURE 4 is a schematic diagram of the electrical circuitry associated with the electrolytic device.

The drawings illustrate an electrolytic device provided for removing silver from used photographic fixing solution having surrounding wall portions being joined by a bottom defining a container for receiving an intermittent flow of solution. The electrolytic device is provided with a unidirectional source of power having a positive terminal connected to a pair of anodes carried in the container and a negative terminal connected to a cathode disposed in an intermediate portion of the container spaced from the anode forming an electrolytic cell. An overflow port A is positioned in the surrounding wall of the container adjacent the top thereof for permitting solution to flow from the container when the level of the solution rises thereabove. A recirculation port B is positioned in the surrounding wall adjacent the top of the container opposite the overflow port and is spaced therebelow. A pump C is positioned externally of the container. Means are provided for communicating between the recirculation port and the pump C for permitting fluid to be pumped from the container. A conduit is provided for supplying spent photographic fixing solution from an external source to the pump so that the solution from the external source is mixed with fluid being recirculated before such enters the container. The cathode D includes surrounding electrically conductive wall portions which define a removable receptacle. Vents are provided in the receptacle walls permitting solution to flow therethrough. Steel wool is carried in the receptacle in electrical contact with the conductive receptacle walls. The negative side of the unidirectional power source is connected to the electrically conductive receptacle wall and the steel wool so as to place a negative potential thereon. An entrance port E is positioned in the lower portion of the receptacle. Means is provided for connecting the output of the pump with the entrance port for controlling the flow of solution therebetween. A voltage regulating means F is connected in parallel with the anode and cathode electrodes for maintaining the voltage on the electrodes constant as the solution is added to, and is removed from the fixing solution although the current flow through the solution varies.

The electrolytic device includes a container having front and rear walls 10 and 11, and side walls 12 and 13 which are joined by a bottom 14. A top 15 is connected by hinges, not shown, to the side wall 13 for providing access to the container. The container is constructed of any suitable non-conducting material, such as hard rubber or a synthetic product. The electrical controls for the electrolytic device are carried in a housing 16 on the top 15. Details of the electrical circuitry are discussed below in connection with FIGURE 4.

An overflow port A is positioned in the side wall 13 of the container adjacent the top thereof for permitting solution to flow from the container when the level of the solution rises thereabove. A recirculation port B is positioned in the side wall 12 adjacent the top of the container opposite the overflow port A, and is placed slightly below the overflow port A.

The pump C is positioned externally of the container on the side wall 12 and may be any suitable pump, such as a pulsating pump. Means, such as a conduit 17, communicates between the recirculating port B and the pump C for permitting fluid to be pumped from the container so that the photographic fixing solution carried in the container can be continuously recirculated. Means, such as a conduit 18, is provided for supplying the spent photographic fixing solution from an external source, such as an automatic film processing machine, to the pump C so that the solution from the external source is mixed with fluid being recirculated before such enters the container. End 20 of the conduit 18 is connected directly to the output of the automatic film processing machine (not shown), while the other end 21 of the conduit 18 is connected to a longitudinal port of a T-joint 22. It is noted that the lateral port 23 of the T-joint 22 is in communication with the recirculation port B, and the other longitudinal port 24 of the T-joint 22 is connected to the conduit 17. Thus, the pump C simultaneously draws fluid from the automatic film processing machine and the container through the recirculating port B so that the fluid going into he input port of the pump C is a mixture of the fluid coming from the automatic processing machine and the fluid being recirculated in the container. In some applications it may be desired to place a metering device in the conduit 18 so as to control the flow of fluid from the automatic processing machine. However, the rate of flow from most automatic processing machines is slow enough that one is not necessary.

The electrolytic cell includes a pair of anode plates 25 mounted on the walls 12 and 13 within the container. The anode plates 25 are rectangular in shape and extend from the bottom of the container adjacent the top thereof. The anode plates are constructed of any suitable material, such as carbon or graphite, and are fastened to the side walls 12 and 13 by bolts 26. An aperture 27 is provided in the anode plates for permitting communication between the output port and the recirculation port with the interior of the container.

The cathode D for the electrolytic cell includes a receptacle carried in the intermediate portion of said container spaced from the anodes. The cathode includes a pair of spaced conductive side walls 28 being joined by a pair of non-conductive supporting walls made of any suitable material, such as wood. The side walls are preferably made of a conductive material, such as stainless steel, and have vertically spaced vents 30 therein for permitting the fluid to be recirculated therethrough.

The bottom 31 of the receptacle is constructed of a conductive plate which joins the side walls 28 and the end walls 29. A pair of laterally spaced vertical guides 32 are carried on the wall 11 so as to properly align the receptacle within the container and permit readily removal of the receptacle from the container. The receptacle has a laterally extending dowl 33 positioned adjacent its top between the end walls 29 for providing a means for raising the receptacle from the container. The receptacle is packed with conductive steel wool 34 which is in electrical contact with the conductive side walls 28 and the bottom 31 of the receptacle so that such act as a cathode in the electrolytic cell.

An entrance port E is positioned in the lower portion of the receptacle and a conduit 35 communicates between the output of the pump C and the entrance port E. The conduit 35 extends into the container through an aperture 36 in the side wall so that as the pump C pumps fluids into the container it forces the fluid up through the steel wool 34 carried in the receptacle and out of the side vents 30 back through the recirculating port B. Such insures a maximum surface contact with the steel wool 34 and the conductive sides 28 and bottom 31 of the receptacle.

It is noted that as long as fluid is not being supplied from the automatic film processing machine, the level of fluid in the container will remain below the overflow port A, and the fluid will be continuously recirculated so as to remove the maximum amount of silver therefrom.

One reason for the high efficiency of the electrolytic device, illustrated in the drawings, is the great amount of surface area provided by the conductive side plates 28, bottom plate 31, and the steel wool 34 carried in the receptacle. Another reason is that by mixing the spent fluid from an external source with the recirculated fluid and forcing such through the steel wool carried within the receptacle such insures a greater period of time that the fluid is in contact with the negatively charged receptacle, which constitutes the cathode of the electrolytic cell. The electrolytic device has proven to be so efficient that it is being used to remove silver from exhausted fluid from existing electrolytic cells.

An alligator clip 37 is illustrated as being connected to one of the side plates 28 of the receptacle, and such is electrically connected to the negative side of the unidirectional power source which will be described in connection with FIGURE 4. The elongated anodes 25 insures a uniform current flow through the solution carried within the container between the cathode.

The electrical circuitry for the electrolytic cell is illustrated in FIGURE 4. The circuitry includes a transformer $T_1$ having its primary windings connected to a suitable power source 38. Switch $SW_1$ is connected in series with the power source 38 and the pump C is connected in shunt across the primary windings of the transformer $T_1$. The transformer is a step down transformer and steps the voltage to a low value in the range of three-quarters of one volt across the secondary winding. The output signal on the secondary winding is rectified by a pair of silicon controlled rectifiers 39 and 40. Lead 41 connects the output of the rectifiers 39 and 40 directly to the anodes 25 carried within the container. The secondary winding has a center tap 42 and a lead 43 is connected thereto. A capacitor 44 for filtering the rectified signal is connected between the lead 41 and the lead 43. A variable resistor 45 is connected in series with the lead 43 between the center tap 42 and the cathode D. The voltage regulating means F is connected in shunt with the anodes 25 and the cathode D between the conductors 41 and 43 for maintaining the voltage on the electrodes at a constant value even though the current is permitted to vary as the silver is removed from the solution in the container. A pilot light 46 is electrically connected through a third winding 46a of the transformer for indicating when the circuit is energized.

It is important that the voltage on the anodes 25 and cathode D electrodes to be maintained constant and not permitted to rise so as to avoid undesirable impurities, such as carbon and sulfides from collecting on the cathode during the electrolytic operation. By maintaining the voltage in approximately the three-quarter volt range the purity of the silver being collected on the cathode is of a high quality.

Since the electrolytic device is connected directly to the output of an automatic film processing machine, the spent photographic fluid, having a high concentration of silver, is supplied directly to the electrolytic device. If a voltage regulating means, such as the Zener diode, were not in the circuit, the voltage at the electrode would vary as the silver was removed from the solution. Prior to placing a voltage regulating means in shunt with the electrodes after the silver was removed from the solution, the solution was a cloudy mixture and was not normally suitable for reuse. However, by maintaining the voltage on the electrodes at a low and constant value the solution, after being rejuvenated by removing the silver therefrom, is clear and may be reused in particular applications.

The subject invention eliminates the necessity of making frequent trips to laboratories and hospitals for picking up the spent photographic fixing solution. The receptacle which constitutes the cathode of the electrolytic device merely has to be picked up approximately once a month for removing the silver collected thereon. Under some circumstances, it may be desirable to place the receptacle in a sealed package and mail it to the processing laboratory.

While a preferred embodiment of the invention has been described using specific terms, such description is for illustrative purposes only, and it is to be understood that changes and variations may be made without departing from the spirit or scope of the following claim.

What is claimed is:
1. In an electrolytic device for removing silver from used photographic fixing solution having surrounding wall portions being joined by a bottom defining a container for receiving an intermittent flow of solution and being provided with a unidirectional source of power having a positive terminal connected to a pair of anodes carried in the container and a negative terminal connected to a cathode disposed in an intermediaate portion of the container spaced from the anode forming an electrolytic cell, the improvement comprising: an overflow port positioned in the surrounding wall of said container adjacent the top thereof for permitting solution to flow from said container when the level of the solution rises thereabove; a recirculation port positioned in the surrounding wall adjacent the top of said container opposite said overflow port and being spaced therebelow; a pump positioned externally of said container; conduit means communicating between said recirculation port and said pump permitting fluid to be pumped from the container; conduit means for supplying spent photographic fixing solution from an external source to said pump so that the solution from the external source is mixed with fluid being recirculated before such enters the container; said cathode including electrically conductive means for collecting silver, said negative side of said unidirectional power source being connected to said electrically conductive means for collecting silver so as to place a negative potential thereon, an entrance port positioned in the lower portion of said container, conduit means for connecting the output of said pump with said entrance port for controlling the flow of solution therebetween, whereby said pump forces photographic fixing solution into said entrance port of said container through said means for collecting silver and out of said recirculation port of said container for recirculating said fluid through said means for collecting silver so that substantially all of the silver in said solution is deposited on the means for collecting silver.

References Cited
UNITED STATES PATENTS

| 2,158,410 | 5/1939 | Doran | 204—109 |
| 2,588,450 | 3/1952 | Zadra | 204—109 |
| 3,003,942 | 10/1961 | Cedrone | 204—109 XR |
| 3,202,599 | 8/1965 | Schierholt | 204—228 XR |

HOWARD S. WILLIAMS, *Primary Examiner.*

D. R. VALENTINE, *Assistant Examiner.*

U.S. Cl. X.R.
204—228, 109, 275